United States Patent [19]
Harrington

[11] Patent Number: 6,072,591
[45] Date of Patent: Jun. 6, 2000

[54] SUM AND DIFFERENCE ERROR DIFFUSION

[75] Inventor: Steven J. Harrington, Webster, N.Y.

[73] Assignee: Xerox Corporation, Stamford, Conn.

[21] Appl. No.: 08/885,691

[22] Filed: Jun. 30, 1997

[51] Int. Cl.[7] .............................. B41B 15/00; B41J 15/00; G06F 15/00; G06K 1/00
[52] U.S. Cl. ........................... 358/1.9; 358/515; 358/521; 358/534; 382/167; 382/252; 382/275
[58] Field of Search ........................... 395/109; 382/252, 382/167, 275, 162, 163; 358/515, 518, 520, 521, 534, 530; 345/89; 399/181, 39, 40, 231; 430/43, 42, 44

[56] References Cited

U.S. PATENT DOCUMENTS

| | | | |
|---|---|---|---|
| 5,014,123 | 5/1991 | Imoto ........................................ | 358/75 |
| 5,027,195 | 6/1991 | Cooley et al. .......................... | 358/500 |
| 5,353,127 | 10/1994 | Shiau et al. .............................. | 358/458 |
| 5,402,245 | 3/1995 | Motta et al. ............................. | 358/298 |
| 5,519,815 | 5/1996 | Klassen .................................... | 395/109 |
| 5,621,546 | 4/1997 | Klassen et al. .......................... | 358/536 |
| 5,649,071 | 7/1997 | Klassen et al. .......................... | 395/109 |
| 5,819,035 | 10/1998 | Devaney et al. ................... | 395/200.32 |

OTHER PUBLICATIONS

Mano, M. Morris, Computer Systems Architecture, 1993, pp. 104–105.

Robert W. Floyd and Louis Steinberg; "An Adaptive Algorithm for Spatial Greyscale" by, Proc. Soc. Inf. Disp. 17, 75–77, 1976.

Jarvis, Judice, and Ninke; "A Survey of Techniques for Display of Continuous–Tone Pictures on Bilevel Displays", Computer Graphics and Image Processing, 5, pp. 13–40, 1976.

Stucki, "Image Processing for Document Reproduction", Advances in Digital Image Processing, pp. 177–218, New York, Plenum, 1979.

Fan, "A Simple Modification of Error Diffusion Weights", Proceedings of the IS&T 46th Annual Conference, pp. 113–114, Boston, 1993.

Venable et al., "Selection and Use of Small Color Sets for Pictorial Display", Proc IS&T Annual Meeting, Rochester, 1990.

Miller et al. "Color Halftoning Using Error Diffusion and a Human Visual System Model", Proc IS&T Annual Meeting, Rochester, 1990.

*Primary Examiner*—Edward L. Coles
*Assistant Examiner*—David Rosenblum
*Attorney, Agent, or Firm*—Aditya Krishnan

[57] ABSTRACT

A vector error diffusion system for quantizing pixel value in color images, which initially determines whether any pixel should be white or colored, and subsequently determines whether the pixel should be a primary color, a secondary color or black.

12 Claims, 3 Drawing Sheets

SUM AND DIFFERENCE ERROR DIFFUSION

The invention relates to an apparatus and a method for controlling colors printed by a printer or displayed on a monitor to reduce the visibility of error diffusion dot patterns, and more particularly, to an apparatus and method for performing vector error diffusion with simpler calculations.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

BACKGROUND OF THE INVENTION

Error diffusion is a well known technique for reducing continuous tone images to a pattern of black and white spots for printing on a binary device. A process for error diffusion is disclosed in an article entitled "An Adaptive Algorithm for Spatial Greyscale" by Robert W. Floyd and Louis Steinberg, Proc. Soc. lnf. Disp. 17, 75–77 (1976). The process involves an algorithm which determines whether or not to print a dot at a certain location based on a comparison of the continuous tone data with a threshold value. Gray levels above a chosen threshold are assigned a dot to be printed and those below the threshold are not assigned a dot to be printed. If the threshold corresponds to midway between black and white, the method always chooses the closer of black and white. The inherent error resulting from such a choice is propagated in specified amounts to adjacent picture elements or pixels not yet considered to change the pixels prior to thresholding. This method produces a more accurate representation of a gray tone over a small area encompassing several dots than conventional halftoning. Hence, the error in the intensity of the digital image is diffused and, on average, zero.

The fraction of the error added to each neighbor depends on a set of weights, the total error being multiplied by the weight corresponding to a given neighbor and then added to the value of that neighbor. The choice of weight can greatly affect the image quality, and much has been said about weights appropriate for giving pleasing results. Examples of weights other than those in the original Floyd and Steinberg algorithm may be found in papers by Jarvis, Judice, and Ninke ("A Survey of Techniques for Display of Continuous-Tone Pictures on Bilevel Displays", Computer Graphics and Image Processing, 5, pp. 13–40, 1976), Stucki, ("Image Processing for Document Reproduction", *Advances in Diaital Imaae Processina*, pp. 177–218, New York, Plenum, 1979), and Fan, ("A Simple Modification of Error Diffusion Weights", Proceedings of the IS&T 46th Annual Conference, pp. 113–114, Boston 1993) and in U.S. Pat. No. 5,353,127 to Shiau et al.

In the case of color, however, one cannot just apply simple error diffusion to each color component independently. To do so would produce noisy images. For example, a light blue can be produced by magenta and cyan pixels. But if the magenta and cyan are processed independently, then some pixels may have both magenta and cyan, yielding blue, while others have no ink at all, giving white. This mixture of white, blue, magenta and cyan will have more contrast and look noisier than pixels of magenta and cyan alone. The process of independently processing each channel can result in any and all of the eight possible pixel colors distributed over an image area.

The problem of image noisiness can be reduced by the method of vector error diffusion. In this scheme the color chosen for each pixel is the color in a selected color space closest to the desired value, where the desired value is the input value modified by the errors diffused from neighboring pixels. This tends to confine the pixel colors to a subset near the input value and reduces the noise. What is known as vector error diffusion was described in a paper by Venable et al., "Selection and Use of Small Color Sets for Pictorial Display", Proc IS&T Annual Meeting, Rochester, 1990 and in a paper by Miller et al. "Color Halftoning Using Error Diffusion and a Human Visual System Model", Proc IS&T Annual Meeting, Rochester, 1990. In vector error lo diffusion colors are treated as points in a three dimensional space, with the colors printable or displayable at a given pixel discrete locations within that space. When a continuous tone color is to be displayed, the closest displayable or printable color is selected, and the error (the difference between the input color and added error, and the output color) is calculated as a vector in color space. Here, the "closeness" might be the simple distance in color space or a weighted distance based on the human visual model. The vector is the difference between the desired color and the available color. The (vector) error is then diffused in the same way as in normal error diffusion.

There are, however, some problems with vector error diffusion. One is the difficult three dimensional computation required to find the closest color at each pixel. Second, the method is unstable for colors that are near the gamut boundary. With these colors the addition of errors from neighboring pixels can take the desired color out of the gamut. Then the nearest color will generate an error that leads even further outside the gamut and the method collapses or produces unstable results. A third problem is that the method may still not select the optimal set of colors. For example, it may produce a gray from white and black pixels, where a smoother image might be produced if cyan, magenta and yellow were used because there would be less luminance contrast.

A solution to this third problem was proposed by U.S. Pat. No. 5,621,546 to Klassen et al. That patent suggests performing the error diffusion in two steps. The first is a simple error diffusion performed on the sum of the requested colorant amounts for the color separations. This indicates when color is needed, but does not tell which color should be selected. The pixel color closest to the desired color is chosen using a vector error diffusion process. This tends to disperse the color giving broad coverage of light colors rather than a pattern of dark spots on a white background. The improved image quality is at a cost of increased complexity (namely an additional error diffusion calculation).

The references cited herein are incorporated by reference for their teachings.

SUMMARY OF THE INVENTION

In accordance with the invention there is provided a method for color image error diffusion using vector error diffusion, which simplifies vector error diffusion calculations.

In accordance with one aspect of the invention, there is provided a vector error diffusion system which initially determined whether any pixel should be white or colored, and subsequently determines whether the pixel should be a primary color, a secondary color or black.

In accordance with another aspect of the invention, there is provided a halftoning processor preparing documents for printing at a color printer, the documents defined by plural separations, each separation including a set of color separation image signals describing optical density therein with c density levels, for a destination color printer rendering density with d density levels, comprising:

a separation signal input receiving separation image signals corresponding to a selected discrete area of the document;

a circuit to sum the separation images signals;

a set of comparison circuits comparing the separation image signals with each other;

a separation counting logic arrangement using the sum to identify a number of separation signals with d density levels to be printed at the discrete area;

a color determination logic arrangement, responsive to the separation counting logic and the comparison circuits to generate print signals whereby specific colorants are deposited at the discrete area;

an error distribution arrangement, determining any differences between the received separation image signals and the print signals, and adding the determined difference, if any, to image signals corresponding to areas adjacent to the discrete area, to be processed.

In this invention a method for color error diffusion is proposed that overcomes the problems with other methods. Generally, the method maximally disperses color, yet the computations are simpler. The determinations of the pixel color are simpler than vector error diffusion and stable near gamut boundaries.

In this method, instead of applying error diffusion directly to the colors c, m, y, we work with their sum and differences.

$$s = c + m + y$$

$$t = c - m$$

$$u = m - y$$

From these evaluations, we determine initially use s to determine whether any pixel should be black, white or colored. The values for t and u are used to decide on primary color, a secondary color or black. The difference terms t and u are then used to decide which primary or secondary color should be printed. With this method error diffusion is only carried out on three channels. There is no need to calculate color distances; a simple decision tree selects the output color at each pixel. Only two decisions are required for white or black pixels and four decisions for selecting one of the other six colors.

These and other aspects and advantages of the invention will become apparent from the following detailed description of preferred embodiments when taken in conjunction with the accompanying drawings, in which.

Figure 1:
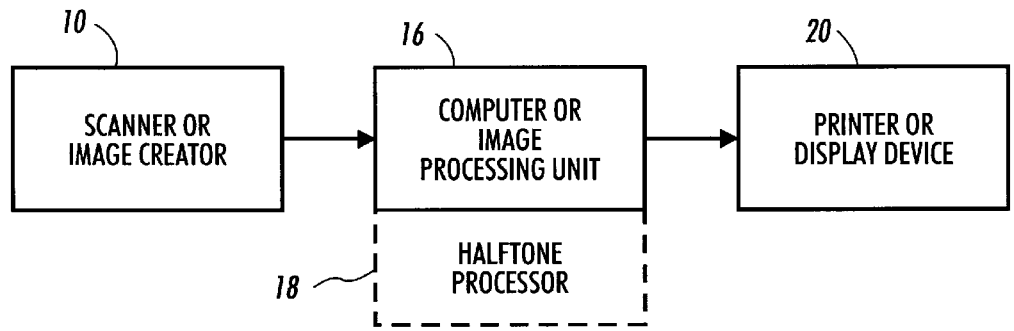
FIG. 1 shows a generalized system in which the present invention may find use.

Referring now to the drawings where the showings are for the purpose of describing an embodiment of the invention and not for limiting same, a basic image processing system is shown in FIG. 1. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a density between a minimum and a maximum. Accordingly, pixels are defined by intensity and position. In the particular color system to be discussed, color documents are represented by multiple sets of image signals, each set (or separation) represented by an independent channel, which is usually processed independently. A "color image" as used herein is therefore a document including at least two lo separations, such as in the Xerox 4850 Highlight Color Printer and commonly three or four separations, such as in the Xerox 4700 Color Laser Printer or the Xerox 5775 Digital Color Copier, or sometimes more than 4 separations. One possible digital copier (a scanner/printer combination) is described for example, in U.S. Pat. No. 5,014,123 to Imoto, incorporated herein by reference. Each separation provides a set of image signals or separation pixels which will drive a printer to produce one color separation of the image. In the case of multicolor printers, the separations, superposed together, form the color image. In this context, we will describe pixels as discrete image signals, which represent optical density of the document image in a given small area thereof. The term "separation pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at m bits per pixel. This is the image creator, and can include or be any device which produces images to be printed, including computers or word processor, graphics art programs or the like.

Common color scanners produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16, which may be a programmed general purpose computer, or a special purpose processor, or the like. to be processed so that an image suitable for reproduction on image output terminal or printer 20 is obtained. Image processing unit 16 commonly includes a halftone processor 18, which can be a programmed computer operation or a special purpose processor, or the like which converts m bit digital image signals to n bit digital image signals, suitable for driving a particular printer, where m and n are integer values.

Before entering into a description of an embodiment of the invention, the principle of the invention will be discussed. A color pixel can be thought of as a point in a particular color space. In a three color dimensional space, each of three axes define the position of the pixel. Each axes can take on a different component of the color definition, depending on the color space. Thus, color may defined in terms of r,g,b components; colorant C, M, Y components; or by other color space definitions, including HSV, LAB, etc., depending on the color definition. In color image vector error diffusion, the error is given by the difference between the input color with any prior error added thereto, and the output color. The output color will usually be the closest reproducible color. A vector, defined in terms of direction and magnitude, defines the difference. This vector can be added to the next color pixel in the color space, so that the next color pixel is moved in accordance with the added error.

A first problem then, is to define what color to output, based on the input value and any added error. In prior methods, this was done by thresholding each separation, to determine what values to use to drive the output device. Typically, values for C, M, and Y were compared to a reference value, and a separation pixel would be output whenever the threshold was exceeded.

In accordance with the invention, however, the values of the pixel, for example, C, M, and Y are added:

$$s = C + M + Y$$

We use the sum to decide between white and non-white pixels. As noted above, image noise arises in standard color error diffusion process, in part because white pixels occur where color pixel should occur. However, the present invention takes the determined value s, and determines whether any Aseparation pixels should be printed at all. The sum of the color components s is used to decide how much ink is placed at each pixel. The variable s is a measure of how much ink is requested. It is compared to thresholds (or separation thresholds: THREE, TWO, ONE) to decide if there is enough ink requested for three, two, one or none of the ink layers. Three layers gives black, two layers gives a secondary color (red, green or blue), a single layer yields a primary color (cyan, magenta or yellow) and no ink leaves the paper white. If a primary or secondary color is needed, then further tests are required to select the specific color The basic idea is to select the color with the strongest accumulated requests. For this we look at the color differences given by $$t = C - M$$
$$u = M - Y$$

A positive t value means the request for cyan is stronger than that for yellow, while a negative value means magenta is needed more than cyan. A positive u value means magenta is needed more than yellow. The cyan and yellow can be compared by examining the sign of the sum t+u. For the case of a secondary color (red, green or blue), we find which color component has the minimum value and then print the other two components.

In the actual algorithm we do not compare t, u and t+u to zero, no but rather to "biasing" values. This is to remove a gray ambiguity that can result in image textures. If one wanted to produce gray with an ink level of, for example, 1.5 there are three ways to do it. Ideally, one could print a pattern of magenta and green, or a pattern of cyan and red, or finally a pattern of yellow and blue. If we compare t, u and t+u to zero, then all of these possibilities are equally favored. As a result one can find mixed patches of gray produced by all three ways. On an actual printer, these different methods produce different colors leading to a mottled, patchwork appearance. The biasing values, therefore, favors the magenta-green over the cyan-red, and that in turn over the yellow-blue combination. This ordering is chosen to minimize luminance variations across pixels. We use a GRAY-BIAS value (a color determination threshold) of about half an ink unit.

Upon selecting an output color, the values of s, t and u are updated to reflect the state of the output image. Any differences from the desired values are distributed in a conventional error-diffusion manner. In the program fragment the a particular set of weights derived from the U.S. Pat. No. 5,353,127 to Shiau et al. set are employed, but one could use other distribution weights such as the well known Floyd-Steinberg method.

Figure 2:
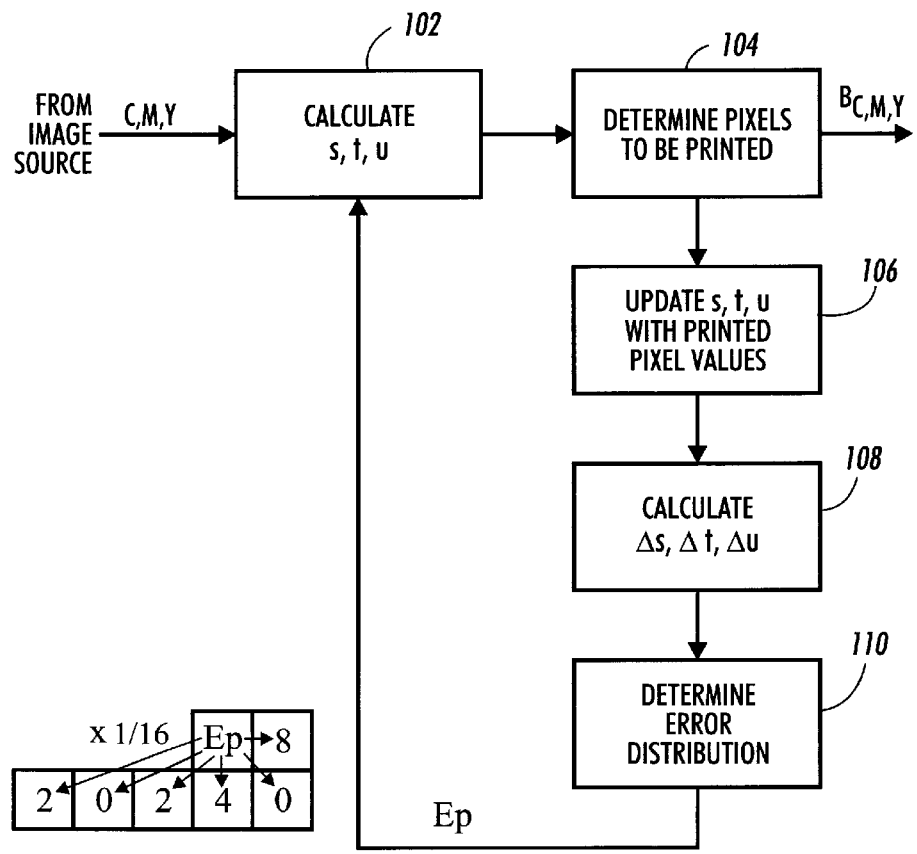
FIG. 2 shows the system of the present invention.

Now we will look at an embodiment of the invention. With reference initially to FIG. 2, the halftoning process that will be implemented is schematically illustrated. Initially, the halftone process receives signals representing each separation. This may be done serially, or in parallel. The received halftone signals are defined with a number of levels greater than that which should be output. Initially, values for s, t and u are arithmetically calculated, at arithmetic calculation of 102. Using s, t and u, the out pixels will be determined output determination 104.

Figure 3:
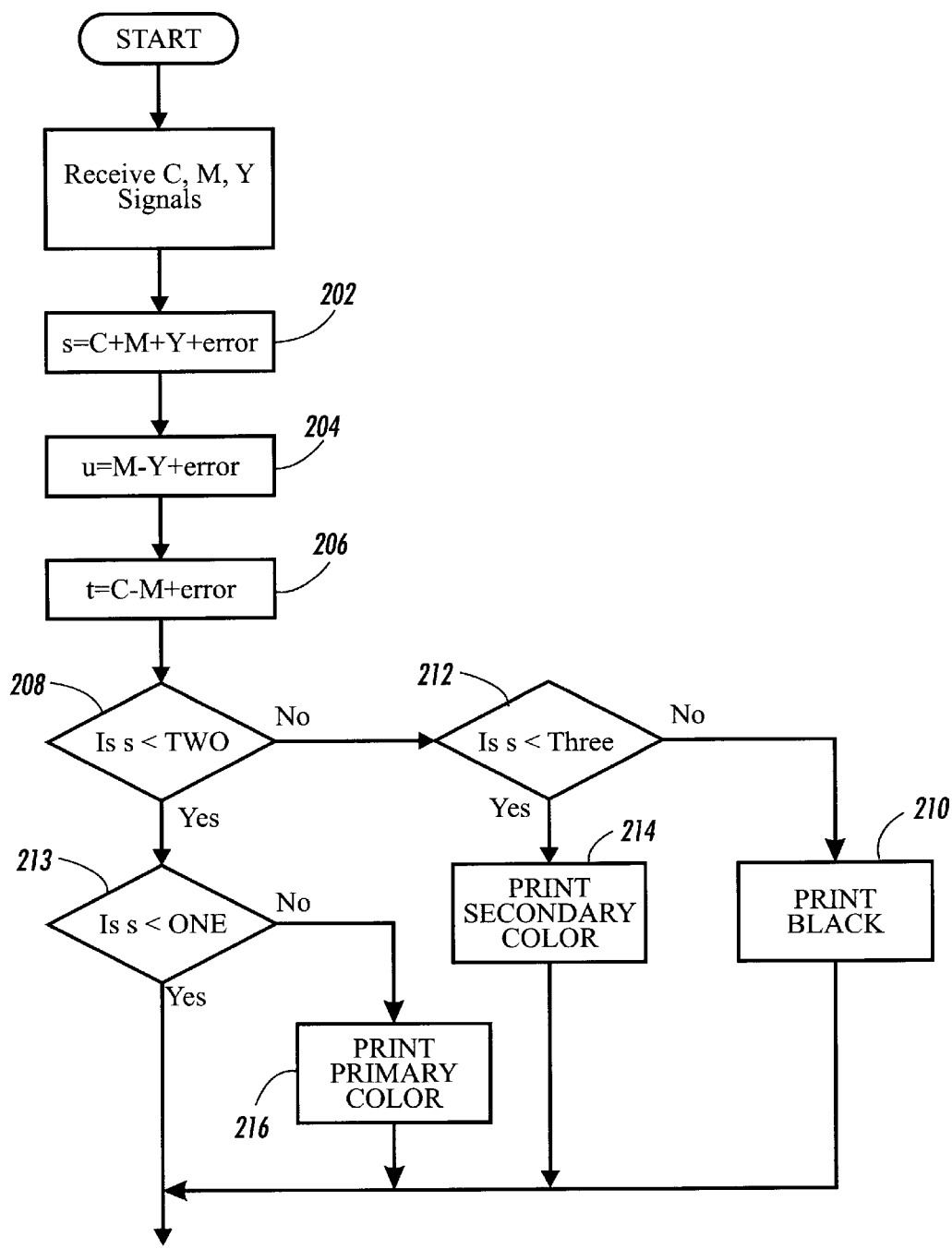
FIG. 3 shows the determination of how many separations will be printed.

Referring now to the flow chart in FIG. 3, s, u and t are calculated from C, M and Y for each color pixel at steps 202, 204 and 206, and, if the process has been in use prior to the particular color pixel that has been generated, and previous halftone errors distributed to the color pixel. If S is not greater than TWO, then it is examined at step 212 to determine whether S is greater than THREE. If S is not greater than THREE at step 214, we enter a routine to print a secondary color (red, blue and green) which are made up of two separations printed together. Otherwise, at step 214 we enter a routine where the pixels should be sent to black, and a black print pixel is printed. Else, at step 213, we enter a routine to print a primary color (cyan, magenta, yellow) when S is less than 2 and S is greater than 1.

Figure 4:
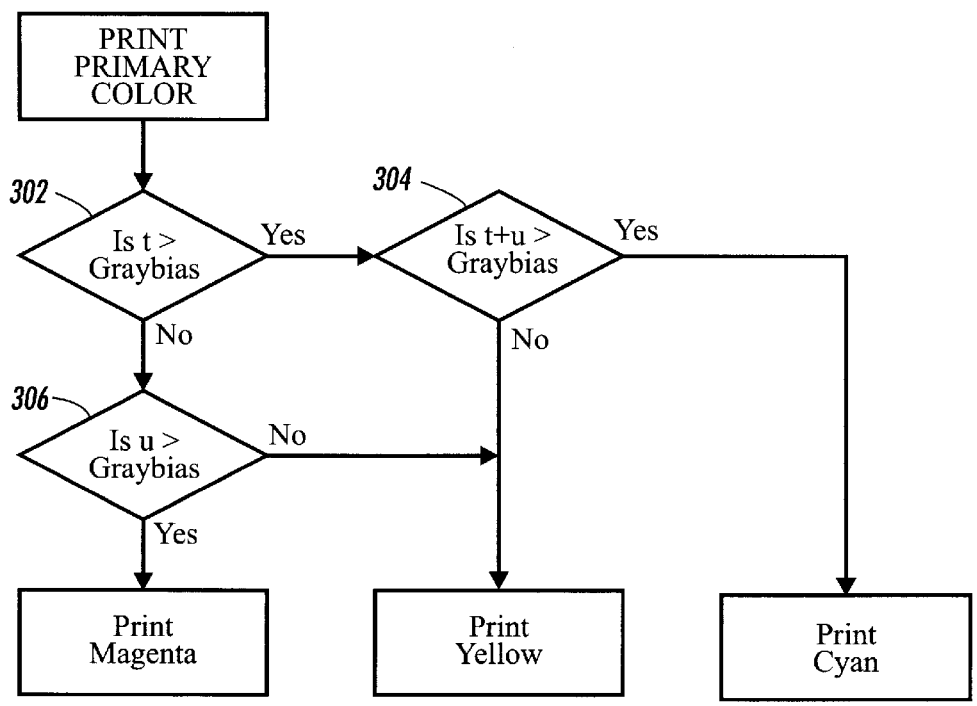
FIGS. 4 and 5 illustrate the determination of what colors will be printed.

At FIG. 4, the Print Primary Color routine takes us to step 302, we ask whether t is greater than a threshold signal we refer to as GRAYBIAS, which is a value selected to insure that the color are always printed the same. At steps 302 and 304, if t is not greater than Graybias, we ask if u is greater than minus Graybias, and if it is, Magenta is printed. At steps 302 and 306, if t is greater than Graybias, and t+u is greater than minus Graybias, we print Cyan. At steps 306, and 304, if u>>Graybias, or if t+u is greater than minus Graybias, Yellow is printed.

Figure 5:
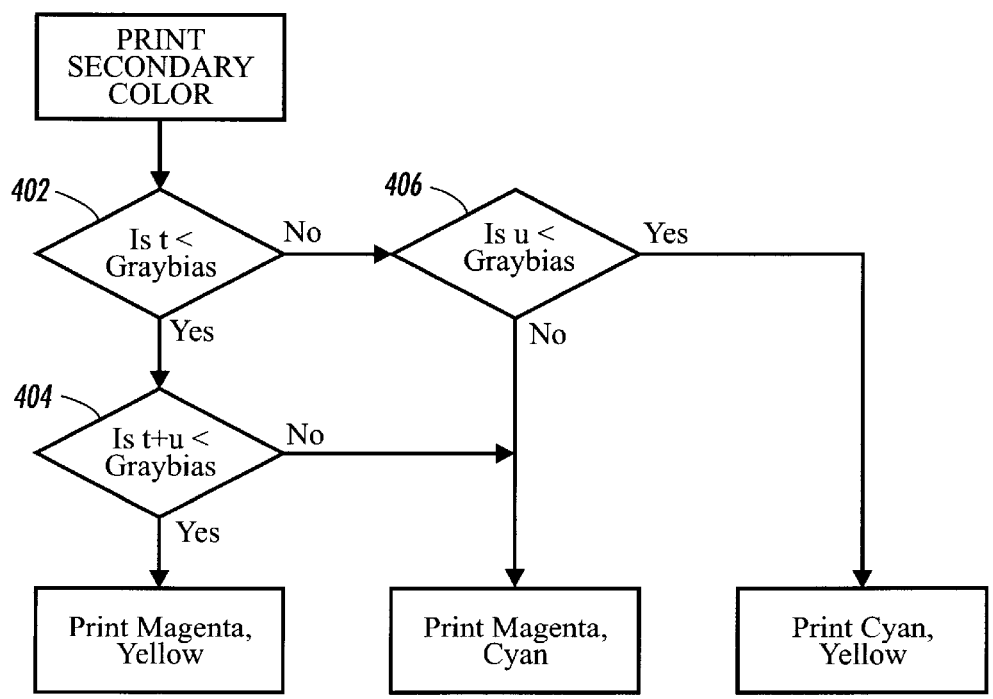

At FIG. 5, the process is shown after entering the secondary color routine. At steps 402 and 404, if t is less than minus Graybias, and t+u is less than Graybias, Magenta and Yellow are printed. At steps 402 and 406, if t is less than>minus Graybias and u is less than Graybias, then Cyan and Yellow are printed. At steps 406, if u is greater than>Graybias, or at step 404, if t+u is not less than Graybias than Graybias, Magenta and Cyan are printed.

Returning now to FIG. 2, at step 106, the values of s, t and u are updates with the output pixel values. Recalling that the input values were generally between 0 and 255, and the output values are either 0 or 255, there is often a difference between the input values and the output values. The differences for each calculated value, Δs, Δt, Δu are calculated at step 108, resulting in an error value for each pixel, $E_P$. At step 110, this weighted distribution of this error to a plurality of neighboring pixels, in accordance with a standard error diffusion process (with Floyd Steinberg weightings show).

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

APPENDIX

The following C program fragment captures the error diffusion process for a scan line using the inventive method:
Copyright, Xerox Corporation, 1996, 1997

```
for (p = 0; p < pixelsPerScan; p++)
    {/* error diffusion for the pixels of a scan line of an image */
    c = ONE - ImageValue(CYANSEP, p);
    m = ONE - ImageValue(MAGENTASEP, p);
    y = ONE - ImageValue(YELLOWSEP, p);
    s = c+m+y + errorAbove_s[p] + leftError_s);
    t = c-m + errorAbove_t[p] + leftError_t);
    u = m- y + errorAbove_u[p] + leftError_u);
    if (s < TWO) /* less than 2-color spot */
        {if (s < ONE) /* less than one spot -- leave it white */
            {;}
        else
            {/* single color spot, find max */
            s -= ONE;
            if (t > GRAYBIAS) /* c > m */
                {if (t+u >- GRAYBIAS) /* c > y */
                    {/* cyan is largest */
                    outputSpot(CYANSEP, p);
                    t -= ONE;
                    }
                else
                    {/* yellow case */
                    outputSpot(YELLOWSEP, p);
                    u += ONE;
                    }
                }
            else     /* m > c */
                {if (u > -GRAYBIAS) /* m > y */
                    {/* magenta case */
                    outputSpot(MAGENTASEP, p);
                    t += ONE;
                    u -= ONE;
                    }
                else
                    {/* yellow case */
                    outputSpot(YELLOWSEP, p);
                    u += ONE;
                    }
                }
            }/* end of single color spot */
        }/* end of less than 2-color spot */
    else
```

APPENDIX-continued

```
        {/* 2 or more colors in spot */
        if (s < THREE) /* 2-color spot -- find min and don't print it */
            {s -= TWO;
            if (t < -GRAYBIAS) /* c < m */
                {if (t+u < GRAYBIAS) /* c < y */
                    {/* cyan is smallest -- red */
                    outputSpot(MAGENTASEP, p);
                    outputSpot(YELLOWSEP, p);
                    t += ONE;
                    }
                else
                    {/* yellow smallest -- blue */
                    outputSpot(CYANSEP, p);
                    outputSpot(MAGENTASEP, p);
                    u -= ONE;
                    }
                }
            else     /* m < c */
                {if (u < GRAYBIAS) /* m < y */
                    {/* magenta smallest -- green */
                    outputSpot(CYANSEP, p); outputSpot(YELLOWSEP, p);
                    t -= ONE;
                    u += ONE;
                    }
                else
                    {/* yellow smallest -- blue */
                    outputSpot(CYANSEP, p);
                    outputSpot(MAGENTASEP, p);
                    u -= ONE;
                    }
                }
            } /* end of two color spot */
        else
            {/* must be black */
            s -= THREE;
            outputSpot(BLACKSEP, p);}
            }
        }/* end of 2 or more color spot */
    /* now distribute errors */
    leftError_s = s - (tmp = (s >> 1));
    errorAbove_s[p] = tmp - (tmp >> 1);
    errorAbove_s[p-1] += (tmp >> 1) - (tmp >> 2);
    errorAbove_s[p-3] += tmp >> 2;
    leftError_t = t - (tmp = (t >> 1));
    errorAbove_t[p] = tmp - (tmp >> 1);
    errorAbove_t[p-1] += (tmp >> 1) - (tmp >> 2);
    errorAbove_t[p-3] += tmp >> 2;
    leftError_u = u - (tmp = (u >> 1));
    errorAbove_u[p] = tmp - (tmp >> 1);
    errorAbove_u[p-1] += (tmp >> 1) - (tmp >> 2);
    errorAbove_u[p-3] += tmp >> 2;
    } /* end of p-loop scan processing */
```

I claim:

1. A printing system, including a processor preparing documents for printing at a color printer, said documents defined by plural separations, each separation including a set of color separation image signals describing optical density therein with c density levels, for a destination color printer rendering density with d density levels, comprising:

a color printer;

a source of separation image signals representing optical density within the separation at one of c levels, for a discrete area therein;

a halftone processor receiving a group of separation signals from each separation from said source, said group of separation signals defining optical density for corresponding discrete areas of the document at c levels in each separation, including:

a first calculating arrangement having an integration function of at least two combinations of said group of separation signals receiving as inputs a group of separations of a separation signal so as to determine the number of image signals that should be printed for comparing an output of the integration function to a series of threshold values for said discrete area of the document, a second calculating arrangement, responsive to said determined number of image signals that should be printed, and the values of each separation image signal, and determining which printer colorants should be deposited at said discrete area of the document, and generating print signals responsive thereto, an error distribution arrangement, determining any differences between said received image signals and said print signals, and adding the determined difference, if any, to image signals corresponding to areas adjacent to said discrete area, to be processed;

an image processor directing signals processed at said halftone processor to said printer to print a halftoned image.

2. The printing system as defined in claim 1, wherein said first calculating arrangement includes:

a summing circuit, summing the receiving separation signals;

a thresholding circuit, comparing sums to a set of separation thresholds, said comparison identifying how many separations should be printed for each discrete location, and producing an output signal indicative thereof.

3. The printing system as defined in claim 2, wherein for a CMYK printer, said output signal indicates printing black, a secondary color or a primary color.

4. The printing system as defined in claim 1, wherein said second calculating arrangement includes:

a plurality of differencing circuits, determining any differences between separation image signals directed thereto;

a thresholding circuit, comparing differences to a color determination threshold; and producing an output of indicating colors to be printed.

5. The printing system as defined in claim 1, wherein said second calculating arrangement includes:

a plurality of differencing circuits, for determining any differences between separation image signals directed thereto;

a thresholding circuit, selecting thresholds responsive to said first circuit determination, for comparing differences to a color determination threshold and outputting printer signals thereby derived.

6. The printing system as defined in claim 1, wherein said error distribution arrangement determines differences between said received image signals and said print signals, as a function of the sum of separations signals, and as a function of the differences between selected separation signals.

7. A halftoning processor preparing documents for printing at a color printer, said documents defined by plural separations, each separation including a set of color separation image signals describing optical density therein with c density levels, for a destination color printer rendering density with d density levels, comprising:

a separation signal input receiving separation image signals corresponding to a selected discrete area of the document;

a circuit including a sum arrangement to sum said separation images signals;

a set of comparison circuits determining a series of comparison by comparing said separation image signals with each other;

a separation counting logic arrangement using said sum to identify a number of separation signals with d density levels to be printed at the discrete area;

a color determination logic arrangement, responsive to said separation counting logic and said comparison circuits to generate print signals whereby specific colorants are deposited at said discrete area;

an error distribution arrangement, determining any differences between said received separation image signals and said print signals, and adding the determined difference, if any, to image signals corresponding to areas adjacent to said discrete area, to be processed.

8. A method of halftoning documents preparatory to printing at a color printer said documents defined by plural separations, each separation including a set of color separation image signals describing optical density therein with c density levels, for a destination color printer rendering density with d density levels, comprising:

receiving separation image signals corresponding to a selected discrete area of the document;

summing said separation images signals for a discrete location of the document;

using said sum to identify a number of separation signals with d density levels to be printed at the discrete area;

comparing using a series of threshold values said separation image signals with each other;

responsive to said summing and said comparison generating print signals whereby specific colorants are deposited at said discrete area;

determining any differences between said received separation image signals and said print signals, and adding the determined difference, if any, to image signals corresponding to areas adjacent to said discrete area, to be processed.

9. The method as defined in claim 8, wherein for separations image signals given as C, M, Y, the summing operation is given by S=C+M+Y.

10. The method as defined in claim 9, wherein said step of identifying a number of separation signals with d density levels to be printed at the discrete area includes thresholding S with at least one threshold signal selected to provide said difference between numbers of separations that should be printed.

11. The method as defined in claim 8, wherein for separations image signals given as C, M, Y, said comparing said separation image signals with each other includes the substeps of:

determining u=M−Y;

determining t=C−M;

determining t+u comparing the results of each determination with others of said determinations, and generating print signals indicative of colorants to deposit at said discrete area.

12. The method as defined in claim 8, wherein for separations image signals given as C, M, Y, and including the substeps of:

determining s=M+C+Y determining u=M−Y determining t=C−M determining u+t determining said differences between said received separation image signals and said print signals as a function of s, u, t and u+t, and adding the determined difference, if any, to values of s, u, t, and u+t corresponding to areas adjacent to said discrete area, to be processed.

* * * * *